United States Patent
Kelly et al.

(10) Patent No.: US 12,086,688 B2
(45) Date of Patent: Sep. 10, 2024

(54) COMPENSATION PULSES FOR QUBIT READOUT

(71) Applicant: Google LLC, Mountain View, CA (US)

(72) Inventors: Julian Shaw Kelly, Santa Barbara, CA (US); Daniel Thomas Sank, Goleta, CA (US)

(73) Assignee: Google LLC, Mountain View, CA (US)

( * ) Notice: Subject to any disclaimer, the term of this patent is extended or adjusted under 35 U.S.C. 154(b) by 169 days.

(21) Appl. No.: 17/748,938

(22) Filed: May 19, 2022

(65) Prior Publication Data

US 2022/0277214 A1  Sep. 1, 2022

Related U.S. Application Data

(63) Continuation of application No. 16/468,150, filed as application No. PCT/US2016/066359 on Dec. 13, 2016, now Pat. No. 11,367,011.

(51) Int. Cl.
*G06N 10/00* (2022.01)
*B82Y 10/00* (2011.01)

(52) U.S. Cl.
CPC ............. *G06N 10/00* (2019.01); *B82Y 10/00* (2013.01)

(58) Field of Classification Search
None
See application file for complete search history.

(56) References Cited

U.S. PATENT DOCUMENTS

| | | |
|---|---|---|
| 6,930,318 B2 | 8/2005 | Vion et al. |
| 2004/0000666 A1 | 1/2004 | Lidar et al. |
| 2005/0098773 A1 | 5/2005 | Vion et al. |
| 2016/0233965 A1 | 8/2016 | Medford |

FOREIGN PATENT DOCUMENTS

| | | |
|---|---|---|
| CA | 2453126 A1 | 5/2005 |
| CN | 102549603 A | 7/2012 |
| EP | 2051138 A1 | 4/2009 |
| EP | 3059864 | 8/2016 |
| JP | 2007-049009 | 2/2007 |
| JP | 2008-108927 | 5/2008 |

OTHER PUBLICATIONS

Notice of Allowance in Canadian Appln. No. 3,046,616, dated May 2, 2023, 1 page.
Notice of Allowance in Chinese Appln. No. 201680091562.9, dated May 25, 2023, 7 pages (with English translation).
CA Office Action in Canadian Application No. 3,046,616, dated Aug. 10, 2022, 4 pages.
(Continued)

Primary Examiner — Matthew L Reames
(74) Attorney, Agent, or Firm — Fish & Richardson P.C.

(57) ABSTRACT

Apparatus and methods for performing qubit readout. In one aspect, an apparatus includes a qubit that operates at a qubit frequency; a frequency controller that is configured to control the qubit frequency and that during a qubit measurement operation is configured to: determine a compensation pulse that when applied to the qubit, counteracts qubit frequency changes during the qubit measurement operation; and apply the determined compensation pulse to the qubit during the qubit measurement operation to maintain the qubit frequency.

20 Claims, 7 Drawing Sheets

(56) References Cited

OTHER PUBLICATIONS

International Preliminary Report on Patentability in International Appln. No. PCT/US2016/066359, dated Jun. 27, 2019, 11 pages.
AU Examination Report in Australian Application No. 2016432315, dated Feb. 26, 2020, 4 pages.
AU Office Action in Australian Application No. 2016432315, dated Apr. 22, 2020, 3 pages.
Egger et al., "Adaptive hybrid optimal quantum control for imprecisely characterized systems," ArXiv, Jun. 2014, 11 pages.
EP Office Action in European Application No. 16876962.8, dated Nov. 17, 2021, 9 pages.
Jeffrey et al., "Fast Scalable State Measurement with Superconducting Qubits," arXiv, Jan. 2014, 9 pages.
Kelly et al., "State preservation by repetitive error detection in a superconducting quantum circuit," arXiv, Nov. 2014, 30 pages.
Koch et al., "Charge insensitive qubit design derived from the Cooper pair box," arXiv, Sep. 2007, 21 pages.
Mirrahimi et al., "Strong measurement and quantum feedback for persistent Rabi oscillations in circuit QED experiments," IEEE, Dec. 2012, 6 pages.
PCT International Search Report and Written Opinion in International Appln. No. PCT/US2016/066359, dated Sep. 8, 2017, 17 pages.
Sank et al., "Measurement-induced state transitions in a superconducting qubit: Beyond the rotating wave approximation," arXiv, Jun. 2016, 6 pages.
Siddiqi et al., "Dispersive measurements of superconducting qubit coherence with a fast, latching readout," arViv, Sep. 2007, 7 pages.
Vijay et al., "Quantum feedback control of a superconducting qubit: persistent rabi oscillations," arXiv, May 2012, 14 pages.
Office Action in Chinese Appln. No. 201680091562.9, dated Nov. 15, 2022, 14 pages (with English Translation).
Office Action in Canadian Appln. No. 3,046,616, mailed on Jan. 25, 2024, 4 pages.
Wei Hong et al., "The Simulation of Quantum Fourier" Microcomputer applications, vol. 27 No. 03, May 2006, 4 pages (with English abstract).

300

```
┌─────────────────────────────────────────┐
│ Determine compensation pulse that counteracts │
│ qubit frequency changes during a measurement  │
│ operation                                      │
│                                          302  │
└─────────────────────────────────────────┘
                    │
                    ▼
┌─────────────────────────────────────────┐
│ Apply determined compensation pulse to qubit  │
│ during qubit measurement operation to maintain│
│ qubit frequency                               │
│                                          304  │
└─────────────────────────────────────────┘
```

FIG. 3

COMPENSATION PULSES FOR QUBIT READOUT

CROSS-REFERENCE TO RELATED APPLICATIONS

This application is a continuation application of, and claims priority to, U.S. patent application Ser. No. 16/468,150, filed on Jun. 10, 2019, which application is a National Stage Application under 35 U.S.C. § 371 and claims the benefit of International Application No. PCT/US2016/066359, filed Dec. 13, 2016. The entire contents of each are incorporated herein by reference.

BACKGROUND

This specification relates to quantum computing.

Classical computers have memories made up of bits, where each bit can represent either a zero or a one. Quantum computers maintain sequences of quantum bits, called qubits, where each quantum bit can represent a zero, one or any quantum superposition of zeros and ones. Quantum computers operate by setting qubits in an initial state and manipulating the qubits, e.g., according to a sequence of quantum logic gates. A calculation ends with qubit readout, collapsing the system of qubits into an eigenstate where each qubit represents either a zero or one.

SUMMARY

This specification describes technologies relating to quantum hardware and methods for performing qubit readout. Uncontrolled shifts in qubit frequency and uncontrolled transitions to qubit levels are avoided by tuning the qubit's frequency with a compensation pulse during readout.

In general, one innovative aspect of the subject matter described in this specification can be embodied in an apparatus comprising a qubit that operates at a qubit frequency and a frequency controller that is configured to control the qubit frequency during a qubit measurement operation, the frequency controller further being configured to: determine a compensation pulse that when applied to the qubit, counteracts qubit frequency changes during the qubit measurement operation; and apply the compensation pulse to the qubit during the qubit measurement operation to maintain the qubit frequency.

The foregoing and other implementations can each optionally include one or more of the following features, alone or in combination. In some implementations qubit frequency changes during a qubit measurement operation comprise uncontrolled shifts in qubit frequency.

In some implementations the compensation pulse comprises a time-dependent control waveform.

In some implementations, to determine the compensation pulse, the frequency controller is configured to iteratively construct compensation pulses, wherein the frequency controller is configured to: measure a shift in qubit frequency during a measurement operation to obtain a measured shift in qubit frequency; construct a compensation pulse that when applied to the qubit, counteracts the measured shift in qubit frequency; apply the compensation pulse to the qubit; and wherein for each iteration the frequency controller is configured to: measure a shift in qubit frequency during a measurement operation; determine whether a completion condition has occurred; in response to determining that the completion condition has not occurred, construct a subsequent compensation pulse for a next iteration; and in response to determining the completion condition has occurred, use the most recently constructed compensation pulse as the determined compensation pulse.

In some implementations determining whether a completion condition has occurred comprises determining whether the measured shift in qubit frequency during a measurement operation for a current iteration is not an uncontrolled shift in qubit frequency.

In some implementations, to determine the compensation pulse, the frequency controller is configured to: initially measure a shift in qubit frequency during a measurement operation; apply an initial compensation pulse to the qubit and measures a shift in qubit frequency during a measurement operation; divide a time period corresponding to the duration of the measurement operation into a plurality of time steps; and sequentially vary the initial compensation pulse at each of the plurality of time steps and measure a shift in frequency during a compensation measurement operation using the varied initial compensation pulse until a resulting measured shift in qubit frequency during the measurement operation is lower than a predetermined acceptable shift.

In some implementations sequentially varying the initial compensation pulse at each of the plurality of time steps comprises, for each time step, maintaining the values of the varied compensation pulse for previous time steps.

In some implementations the qubit occupies one of a plurality of qubit levels, and wherein qubit frequency changes comprise uncontrolled transitions to qubit levels.

In some implementations the qubit levels comprise two computational qubit levels and one or more non-computational qubit levels that are each higher than the computational qubit levels, and wherein uncontrolled transitions to qubit levels comprise uncontrolled transitions to non-computational qubit levels.

In some implementations the compensation pulse comprises a time-dependent control waveform.

In some implementations, to determine the compensation pulse, the frequency controller is configured to iteratively construct compensation pulses, wherein the frequency controller is configured to: identify transitions to non-computational qubit levels during a measurement operation; construct a compensation pulse that when applied to the qubit, counteracts the identified transitions to non-computational qubit levels; apply the compensation pulse to the qubit; and wherein for each iteration the frequency controller is configured to: identify transitions to non-computational qubit levels during a measurement operation; determine whether a completion condition has occurred; in response to determining that completion condition has not occurred, construct a subsequent compensation pulse for a next iteration; and in response to determining that the completion condition has occurred, use the most recently constructed compensation pulse as the determined compensation pulse.

In some implementations determining whether a completion condition occurs comprises determining that no uncontrolled transitions to qubit levels occur during a measurement operation.

In some implementations, to determine the compensation pulse, the frequency controller is configured to: identify transitions to non-computational qubit levels during a measurement operation; apply an initial compensation pulse to the qubit and identifies transitions to non-computational qubit levels during a measurement operation; divide a time period corresponding to the duration of the measurement operation into a plurality of time steps; sequentially vary the initial compensation pulse at each of the plurality of time steps until no transitions to non-computational qubit levels occur.

In some implementations the qubit is a superconducting qubit.

In some implementations the compensation pulse comprises a magnetic flux bias that tunes the qubit frequency.

In some implementations the apparatus further comprises a readout resonator, wherein during a measurement operation the readout resonator is coupled to the qubit and driven by an external radio frequency source.

In some implementations qubit frequency changes occur due to coupling of the qubit to other two or more level systems.

Another innovative aspect of the subject matter described in this specification can be embodied in methods for measuring the state of a qubit, comprising: determining a compensation pulse that when applied to the qubit, counteracts qubit frequency changes during a qubit measurement operation; and applying the determined compensation pulse to the qubit during the qubit measurement operation to maintain the qubit frequency.

The subject matter described in this specification can be implemented in particular embodiments so as to realize one or more of the following advantages.

To determine a state of a qubit, the qubit must be measured. However, the process of measuring a qubit unavoidably disturbs the qubit—due to the presence of hardware required to perform the measurement, and/or the method used to perform the measurement. For example, the state of a transmon qubit may be measured by probing the frequency of a resonator that is coupled to the transmon. To probe the resonator frequency, the resonator may be driven by an external radio frequency source. Such driving can put photons into the resonator. As the resonator fills with photons, the frequency of the qubit coupled to the resonator shifts. Such shifts can reduce accuracy of the measurement process, introducing errors into a computation in which the qubit is involved. As another example, due to the coupling of qubits to resonators, qubits can experience uncontrolled, i.e., unwanted, transitions to high qubit levels such as the 3- or 6-levels, e.g., when the resonator photon occupation becomes sufficiently high. Such transitions can also reduce the accuracy of the measurement process and be a source of error.

A system implementing compensation pulses for qubit readout, as described in this specification, counteracts uncontrolled, i.e., unwanted, shifts in qubit frequency and uncontrolled transitions to qubit levels, e.g., qubit leakage. By determining a compensation pulse to apply to the qubit during a measurement process, the system maintains the qubit frequency at an intended level. The accuracy of the measurement process is therefore increased. Furthermore, by increasing the accuracy of the measurement process, a quantum computation in which the qubit is used may also achieve higher levels of accuracy.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart of an example process for performing qubit readout using compensation pulses.

Like reference numbers and designations in the various drawings indicate like elements.

DETAILED DESCRIPTION

When performing qubit readout using a readout resonator, errors can occur. For example, photons in a resonator can cause a qubit to experience a frequency shift, called an AC Stark shift. Such a frequency shift can move the qubit frequency into resonance with a two-level system (TLS). If the qubit is in a first qubit state −1, resonance with the TLS allows the qubit to decay from 1- to 0-, that is when the qubit is on resonance with the TLS its energy decay lifetime is decreased, meaning that the qubit retains its energy for a shorter time, as illustrated below with respect to FIG. 2A. As another example, photons in a resonator can cause level crossings within the qubit-resonator system. In this case, the qubit may experience uncontrolled, i.e., unwanted, transitions to higher qubit states, i.e., qubit leakage, or in some cases unwanted transitions to lower qubit states.

This specification describes an architecture and method for performing qubit readout. During a measurement operation, qubit frequencies are tuned with a compensation pulse that counteracts deleterious effects caused by the AC Stark shift, including decay into two level systems and leakage from qubit-resonator level crossing.

Example Operating Environment

Figure 1:
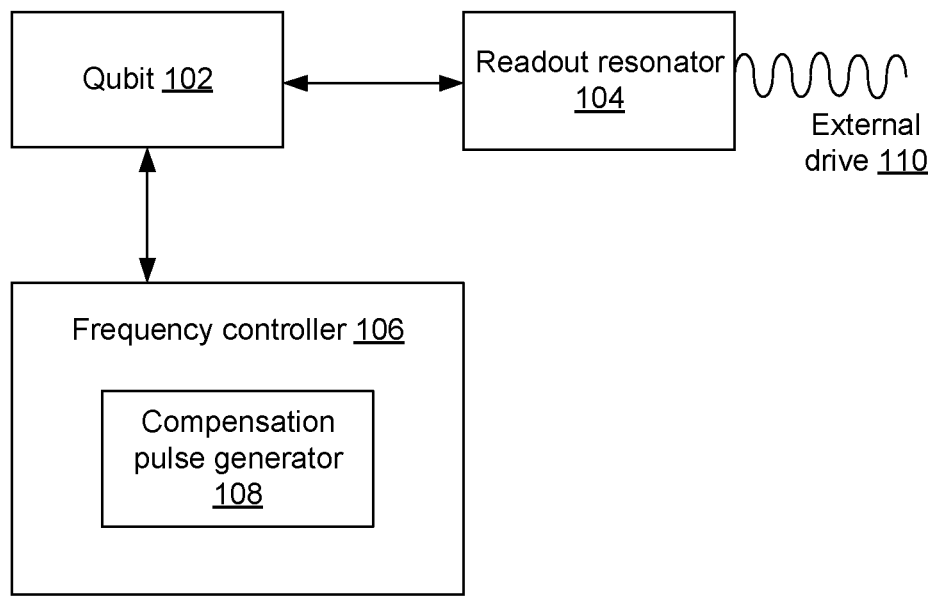
FIG. 1 depicts an example system for qubit readout using compensation pulses.

FIG. 1 depicts an example system 100 for qubit readout using compensation pulses. The system 100 includes a qubit 102, a readout resonator 104 and a frequency controller 106. The readout resonator 104 and frequency controller 106 interact with the qubit 102 through one or more couplers. For convenience one qubit 102 and one readout resonator are shown in FIG. 1, however in some implementations the system 100 may include multiple qubits and multiple readout resonators.

The qubit 102 includes a set of qubit levels, e.g., two computational qubit levels 0-, 1- and one or more non-computational levels that are each higher than the computational qubit levels. Transitions between the qubit levels, e.g., transitions from level 0- to 1-, 1- to 2-, 2- to 3-, etc., may be associated with respective transition frequencies. The computational qubit levels 0- and 1- may be qubit levels used to perform computational operations. Operating a qubit at a particular frequency may therefore describe facilitating a transition between the computational qubit levels using the particular frequency, e.g., using a microwave pulse to induce a transition from 0- to 1- or from 1- to 0-. The range of frequencies that may be used to operate a qubit may be said to form a frequency spectrum.

In order to determine the state of qubit 102 during or after a computational operation, the qubit 102 may be measured. The system 100 may use a readout resonator 104 to assist in measuring the qubit 102. During a measurement operation, the qubit 102 operates at a frequency corresponding to the frequency at which the readout resonator 104 operates, e.g., the qubit 102 and readout resonator 104 can operate at respective frequencies that are between 300 MHz and 1.2 GHz apart from each another. For example, the system may sweep the frequency at which the qubit operates past the frequency at which the readout resonator operates to perform downward qubit level transitions. The state of the qubit 102 may then be measured by probing the frequency at which the readout resonator 104 operates. To probe the frequency at which the readout resonator 104 operates, the readout resonator 104 may be driven by an external driving source 110, e.g., a radio frequency source.

In some implementations the qubit 102 may experience uncontrolled, i.e., unwanted, shifts in frequency or uncontrolled transitions to different qubit levels. For example, driving the readout resonator 104 using an external driving source 110 can cause photons to enter the readout resonator 104. As the readout resonator 104 fills with photons, the frequency at which the qubit operates at may experience shifts. For example, in the case where the frequency at which the readout resonator 104 operates at is higher than the frequency at which the qubit operates at, the qubit frequency may experience downward shifts. In some cases such downward shifts are called AC Stark shifts.

In addition, uncontrolled shifts in frequency or uncontrolled transitions to different qubit levels may occur when the qubit interacts with its environment or objects in its environment. For example, uncontrolled shifts in frequency or uncontrolled transitions to different qubit levels may occur due to the qubit 102 interacting with parasitic systems, e.g., two- or higher-level systems. In some implementations such parasitic systems may be of microscopic but unknown origin. Parasitic—systems can couple to the qubit 102, acting like unwanted qubits. Then, when the qubit 102 operates at a frequency equal to or near to a frequency at which a parasitic system operates, the qubit can lose its energy to the parasitic system. The energy decay lifetime of the qubit can therefore exhibit sharp features as the qubit frequency is tuned, as shown below with reference to FIG. 2B.

Furthermore, in some cases a qubit may experience transitions to high, non-computational qubit levels due to interaction between the qubit 102 and readout resonator 104. Under certain combinations of detuning between the qubit 102 and the readout resonator 104, and the resonator photon number, crossings between qubit levels in the qubit-readout resonator system can occur. These crossings can cause the qubit 102 to jump to other qubit levels.

The frequency controller 106 is configured to control the frequency of the qubit 102. In particular, the frequency controller 106 controls the frequency at which the qubit 102 operates such that during a measurement operation qubit frequency changes that cause uncontrolled shifts in frequency or uncontrolled transitions to different qubit levels are avoided.

To control the frequency at which the qubit 102 operates, a compensation pulse generator 108 included in the frequency controller 106 may be configured to determine a compensation pulse that when applied to the qubit, counteracts uncontrolled qubit frequency changes during a measurement operation. In some implementations the compensation pulse may be a magnetic flux bias that tunes the frequency at which the qubit operates. Determining compensation pulses to counteract uncontrolled qubit frequency changes is described in more detail below with reference to FIGS. 4-7.

The frequency controller 106 may be configured to apply determined compensation pulses to qubits during measurement operations to maintain qubit frequency, e.g., to avoid unwanted shifts in frequency or unwanted transitions to different qubit levels as described above. By applying determined compensation pulses to qubits during measurement operations, errors in qubit measurement may be reduced and the accuracy of the qubit measurement may be increased.

Figures 2A, 2B:
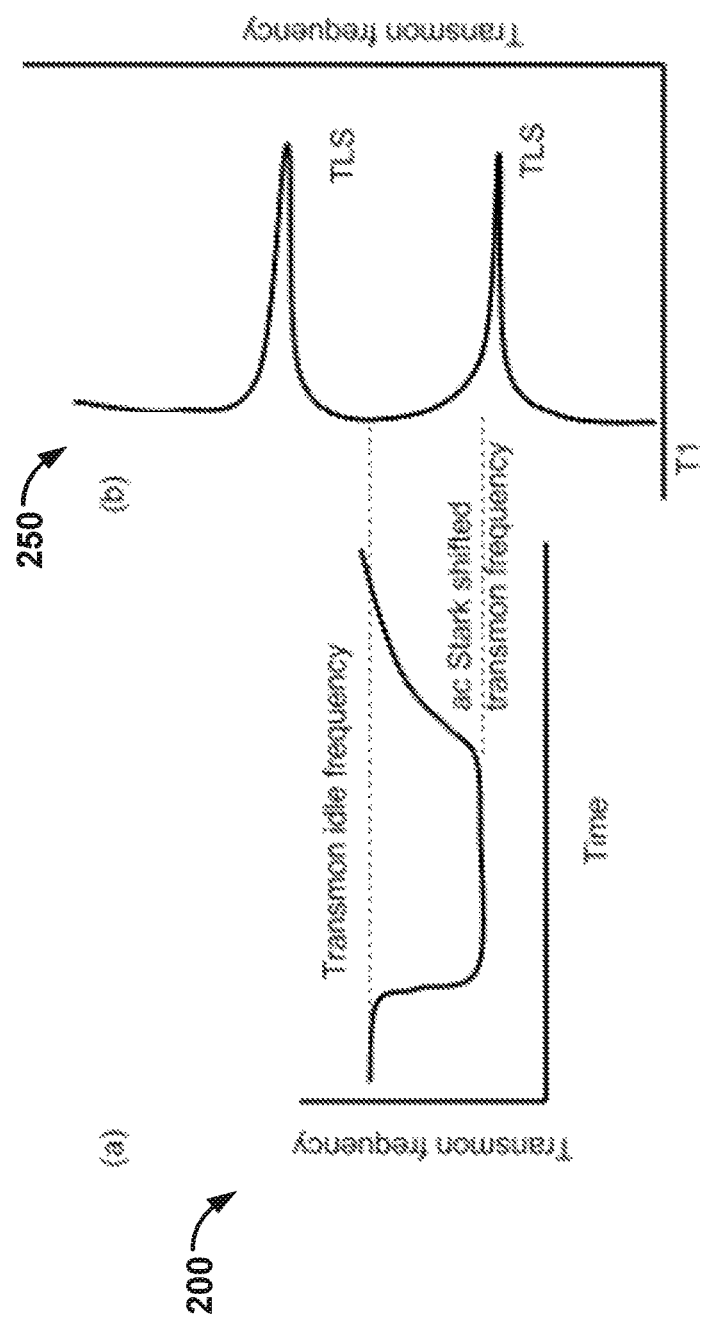
FIG. 2A is an illustration of qubit frequency as a function of time during qubit readout.
FIG. 2B is an illustration of qubit frequency as a function of energy decay lifetime.

FIG. 2A is an illustration 200 of qubit frequency as a function of time during qubit readout. As the resonator fills with photons, the qubit frequency decreases. Once the readout pulse ends, the qubit frequency returns to its idle frequency.

The illustration 200 shows that frequency shifts, e.g., AC Stark shifts, can push the qubit frequency away from a chosen idle value to a frequency that causes interactions with parasitic systems, e.g., parasitic two-level systems. In addition, interactions with parasitic systems can cause a lower energy decay lifetime T1. This reduces accuracy of a readout process, therefore introducing errors.

FIG. 2B is an illustration 250 of energy decay lifetime as a function of qubit frequency. The energy decay lifetime of the qubit shows sharp dips when the qubit frequency is close to a parasitic two-level system frequency.

Programming the Hardware

FIG. 3 is a flowchart of an example process 300 for performing qubit readout using compensation pulses. For example, the process 300 may be performed by the frequency controller 106 of system 100 described above with reference to FIG. 1. For convenience, the process 300 is described performing readout for a single qubit. However, the process 300 may be performed in parallel for systems that include multiple qubits.

The system determines a compensation pulse that when applied to the qubit, counteracts uncontrolled qubit frequency changes during a qubit measurement operation (step 302).

In some implementations uncontrolled qubit frequency changes include unwanted shifts in qubit frequency. For example, as described above with reference to FIG. 1, in some implementations the qubit may be a superconducting qubit, e.g., a transmon qubit. In these examples the state of the transmon qubit may be measured by probing the frequency of a readout resonator that is coupled to the qubit. To probe the resonator frequency, the resonator may be driven by an external radio frequency source. Such driving can put a number of photons into the resonator. As the resonator fills with photons, the frequency at which the qubit is operating may be caused to shift, e.g., downwards if the resonator frequency is above the qubit frequency.

In these cases, the system may determine a compensation pulse that, when applied to the qubit during readout, counteracts such shifts in qubit frequency. As described above with reference to FIG. 1, the determined compensation pulse also maintains the frequency at which the qubit operates at a frequency that does not cause unwanted interactions with parasitic systems, e.g., parasitic two-level systems of microscopic but unknown origin. Methods for determining compensation pulses that when applied to the qubit, counteracts uncontrolled qubit frequency changes during a qubit measurement operation are described in more detail below with reference to FIGS. 4 and 5.

In some implementations uncontrolled qubit frequency changes result in unwanted transitions to qubit levels. For example, as described above with reference to FIG. 1, in some implementations the qubit may be said to occupy one of a plurality of qubit levels. The qubit levels may include two computational qubit levels, e.g., 0- and 1-levels, and one or more non-computational qubit levels that are each higher than the computational qubit levels, e.g., levels 2-, 3-, etc. In these cases uncontrolled qubit frequency changes may result in transitions to non-computational qubit levels. For example, in some implementations the qubit may be a superconducting qubit, e.g., a transmon qubit. As described above, in these examples the state of the transmon qubit may be measured by probing the frequency of a readout resonator that is coupled to the qubit. The transmon qubit may experience uncontrolled transitions to high qubit levels, e.g., the 3- and 6-qubit levels, when the resonator photon occupation becomes sufficiently high. Such transitions are a source of error during a measurement operation.

In these cases, the system may determine a compensation pulse that, when applied to the qubit during readout, counteracts such transitions to qubit levels. In some implementations the determined compensation pulse may also maintain the frequency at which the qubit operates at a frequency that does not cause unwanted interactions with parasitic systems, e.g., parasitic two-level systems of microscopic but unknown origin. In other implementations the determined compensation pulse may include multiple sub-pulses, one of which counteracts unwanted transitions to qubit levels and another that protects the qubit against unwanted interactions with parasitic systems. Methods for determining compensation pulses that when applied to the qubit, counteract uncontrolled transitions to qubit levels during a qubit measurement operation are described in more detail below with reference to FIGS. 6 and 7.

The system applies the determined compensation pulse to the qubit during the qubit measurement operation to maintain the qubit frequency (step 304). For example, in cases where the qubit is a superconducting qubit, e.g., a transmon qubit, the applying the determined compensation pulse may include applying a magnetic flux bias that tunes the qubit frequency. Maintaining the qubit frequency in this manner may reduce errors in the qubit readout process and improve qubit readout accuracy.

Figure 4:
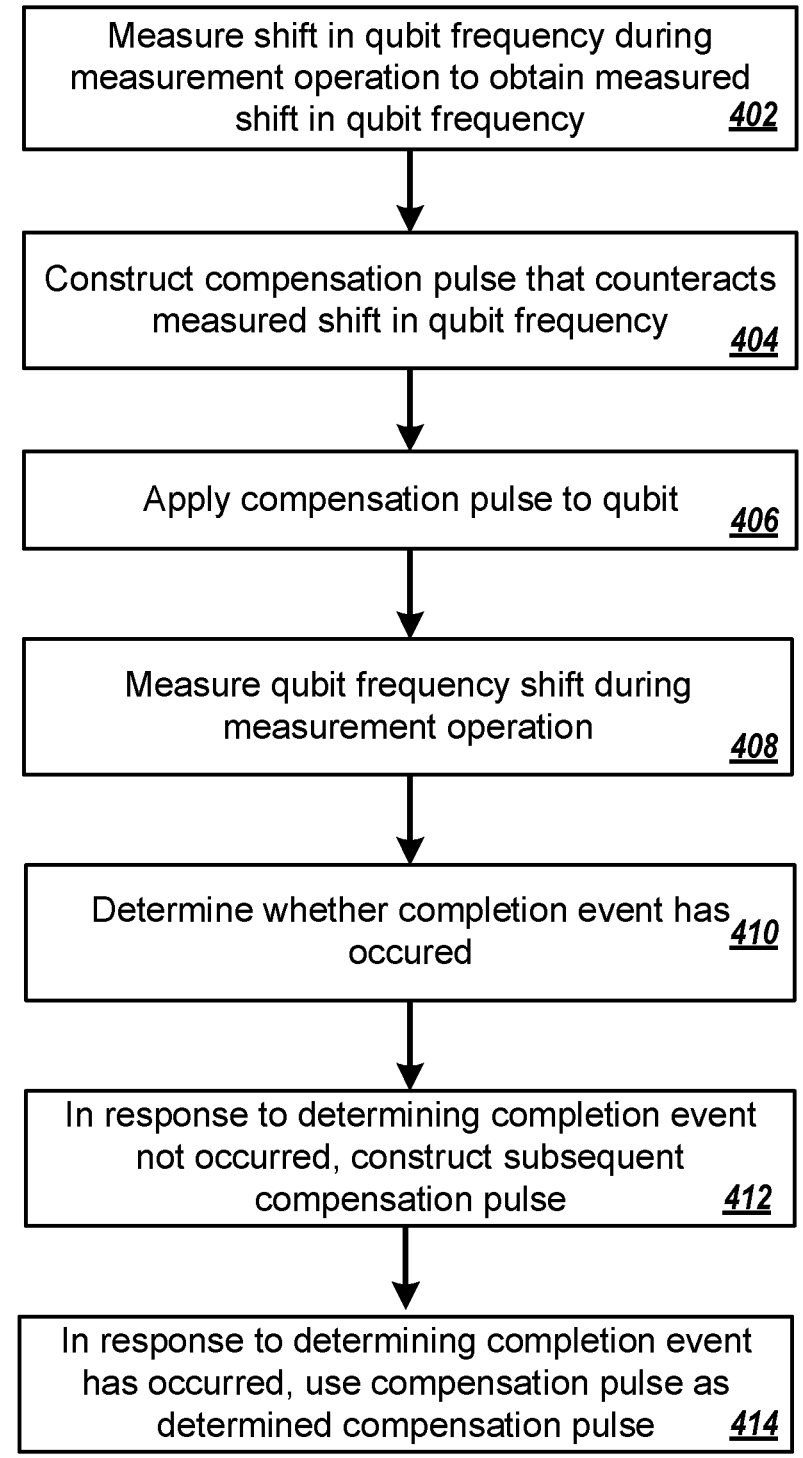
FIG. 4 is a flowchart of an example iterative process for determining compensation pulses to counteract shifts in qubit frequency.

FIG. 4 is a flowchart of an example iterative process 400 for determining compensation pulses to counteract shifts in qubit frequency, as described above with reference to step 302 of FIG. 3. For example, the determined compensation pulse may be used to counteract AC Stark shift during a measurement operation. The process 400 may be performed by the frequency controller 106 of system 100 described above with reference to FIG. 1.

The system measures a shift in qubit frequency during a measurement operation to obtain a measured shift in qubit frequency (step 402). For example, in cases where the qubit is a superconducting transmon qubit, the system may measure a transmon frequency AC Stark shift versus time with no compensation pulse, as shown in FIG. 2A above. The frequency shift versus time is a function of time, e.g., $\omega^0(t)$. The system may measure the shift in qubit frequency by driving the qubit at various frequencies until a qubit state change is observed.

The system constructs a compensation pulse that when applied to the qubit, counteracts the measured shift in qubit frequency (step 404). For example, continuing the example above, the system may use a known map from magnetic flux bias to qubit frequency shift to construct a time-dependent control waveform $c^1(t)$ that counteracts, i.e., cancels, the measured frequency shift versus time $\omega^0(t)$. In some implementations, the compensation pulse may be a pulse that when applied to the qubit, allows for shifts in qubit frequency that minimize or reduce state transitions, i.e., the compensation pulse may not be required to keep the qubit frequency stable.

The system applies the compensation pulse to the qubit (step 406). For example, continuing the example above, the system may apply the compensation pulse $c^1(t)$ to the qubit during a measurement operation.

The compensation pulse $c^1(t)$ may not exactly counteract uncontrolled shifts in qubit frequency. For example, the measurement of the frequency shift versus time $\omega^0(t)$ in step 402 may be imperfect, e.g., due to experimental errors or inaccuracies. In addition, the construction of the time-dependent control waveform $c^1(t)$ in step 404 may be imperfect, e.g., due to imperfections in the known map from magnetic flux bias to qubit frequency shift described above. Furthermore, changing the qubit frequency through the application of $c^1(t)$ may affect the frequency of the readout resonator used to perform the measurement operation. Therefore, the effect of the readout resonator probe pulse may be different compared to the effect of the readout resonator probe pulse used in step 402 above. Therefore the system iteratively repeats steps 402-406. For clarity, an example iteration is described below.

The system measures a shift in qubit frequency during a measurement operation (408). For example, for a j-th iteration, the system measures a current shift in qubit frequency $\omega^j(t)$ during a measurement operation with a j-th compensation pulse applied to the qubit, e.g., with $c^j(t)$ applied to the qubit.

The system determines whether a completion condition has occurred (step 410). In some implementations determining whether a completion condition has occurred includes determining whether the measured shift in qubit frequency during a measurement operation for a current iteration does not cause uncontrolled shifts in frequency or uncontrolled transitions to different qubit levels. For example, for a j-th iteration, the system may determine whether $\omega^j(t)$ is small enough, e.g., whether the frequency at which the qubit operates is still shifting more than an acceptable amount during a measurement operation.

In response to determining that the completion condition has not occurred, the system constructs a subsequent compensation pulse for a next iteration (step 412). For example, for a j-th iteration, the system may use a known map from magnetic flux bias to qubit frequency shift to construct a subsequent compensation pulse $c^{j+1}(t)$ for the j+1-th iteration that counteracts the measured frequency shift versus time $\omega^j(t)$ for the j-th iteration.

In response to determining that the completion condition has occurred, the system uses the most recently constructed compensation pulse as the determined compensation pulse (step 414). The system may then apply the determined compensation pulse to the qubit during the qubit measurement operation to maintain the qubit frequency, as described above with reference to step 304 of FIG. 3.

Figure 5:
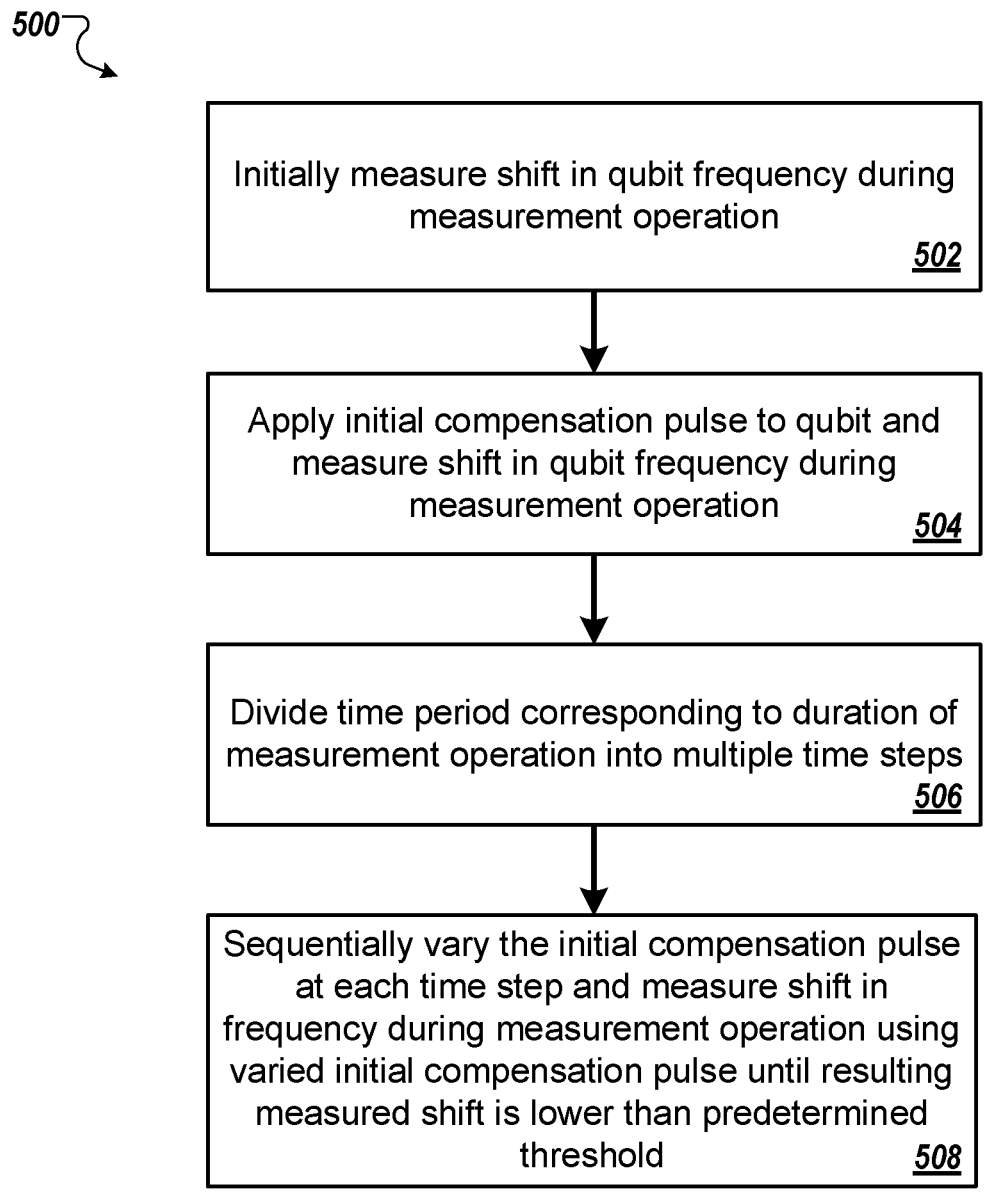
FIG. 5 is a flowchart of an example time-step process for determining compensation pulses to counteract shifts in qubit frequency.

FIG. 5 is a flowchart of an example time-step process 500 for determining compensation pulses to counteract shifts in qubit frequency, as described above with reference to step 302 of FIG. 3. For example, the determined compensation pulse may be used to counteract AC Stark shift during a measurement operation. The process 500 may be performed by the frequency controller 106 of system 100 described above with reference to FIG. 1.

The system initially measures a shift in qubit frequency during a measurement operation (step 502). For example, as described above with reference to step 402 of FIG. 4, in cases where the qubit is a superconducting transmon qubit the system may measure a transmon frequency AC Stark shift versus time. The frequency shift versus time is a function of time, e.g., $\omega(t)$. The system measures the shift in qubit frequency by probing the frequency of a readout resonator coupled to the qubit, e.g., by driving the readout resonator using a probe pulse.

The system applies an initial compensation pulse to the qubit and measures a shift in qubit frequency during a measurement operation (step 504). As described above with reference to step 404 of FIG. 4, the system may use a known map from magnetic flux bias to qubit frequency shift to construct a time-dependent control waveform that counteracts, i.e., cancels, the measured frequency shift versus time $\omega(t)$.

The system divides a time period corresponding to the duration of the measurement operation into a plurality of time steps (step 506). For example, the time period corresponding to the duration of the measurement operation may be represented by [0, T]. In this example, the system may divide the interval [0, T] into a number of discrete time steps, e.g., each of length 1 ns.

The system sequentially varies the initial compensation pulse at each of the plurality of time steps and measures a shift in frequency during a compensation measurement operation using the varied initial compensation pulse until a resulting measured shift in qubit frequency during the measurement operation is lower than a predetermined acceptable shift (step 508).

For example the system may first vary the value of the initial compensation pulse at the first time step until the resulting measured qubit frequency shift at that time step is lower than a predetermined acceptable shift. In some implementations this sets the value of the determined compensation at the first time step. For example, the system may sequentially vary the initial compensation pulse at each of the plurality of time steps by maintaining the values of the varied compensation pulse for previous time steps. In some implementations the system may maintain the compensation pulse at a time step if it is determined that a resulting measured qubit frequency shift at the time step is already lower than a predetermined acceptable shift.

In order to determine how to vary the initial and subsequent compensation pulses at each of the time steps the system may define a metric that represents how much the qubit state is transitioning during a measurement operation, i.e., the error. The system may then parameterize the compensation pulse and run a minimization algorithm with respect to the defined metric. In this manner, the system determines an effective compensation pulse but is agnostic to the actual shape of the determined compensation pulse.

The system uses a compensation pulse that has been varied at one or more of the discrete time steps as the determined compensation pulse. The system may then apply the determined compensation pulse to the qubit during the qubit measurement operation to maintain the qubit frequency, as described above with reference to step 304 of FIG. 3

Figure 6:
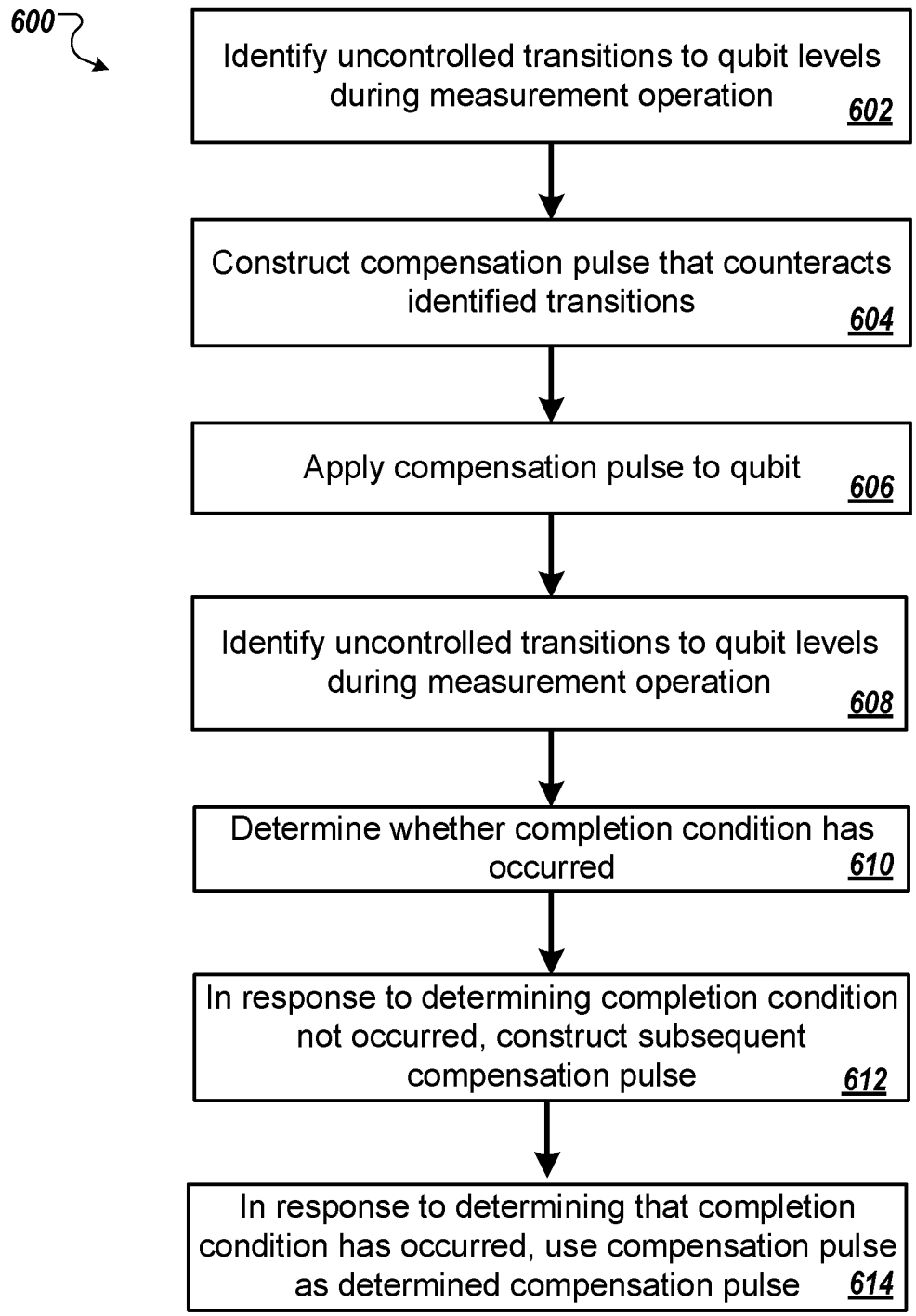
FIG. 6 is a flowchart of an example iterative process for determining compensation pulses to counteract qubit level crossings.

FIG. 6 is a flowchart of an example iterative process 600 for determining compensation pulses to counteract qubit level crossings, as described above with reference to step 302 of FIG. 3. For example, the determined compensation pulse may be used to counteract transitions to non-computational qubit levels during a measurement operation. The process 600 may be performed by the frequency controller 106 of system 100 described above with reference to FIG. 1.

The system identifies uncontrolled transitions to qubit levels during a measurement operation (step 602). For example, as described above with reference to FIG. 3, in cases where the qubit is a superconducting transmon qubit a measurement operation may be performed by probing the frequency of a readout resonator coupled to the qubit. In these cases the system may identify transitions to high, non-computational qubit levels, e.g., 3- and 6-qubit levels, during a measurement operation caused by interaction of the qubit with the readout resonator. For example, for certain combinations of detuning between the qubit and the resonator, and the qubit and the resonator photon number, crossings between qubit levels in the transmon-resonator system may occur.

The system constructs an initial compensation pulse $c^0(t)$ that when applied to the qubit, counteracts the identified uncontrolled transitions to qubit levels (step 604). For example, the system may identify combinations of qubit-resonator detunings and photon numbers that cause transitions to non-computational qubit levels and construct a compensation pulse that avoids or moves quickly through the identified combinations. As another example, the system may identify uncontrolled couplings in the qubit, e.g., to other qubits, microwave modes or microscopic defects and construct a compensation pulse that avoids the uncontrolled couplings.

The system applies the compensation pulse to the qubit during a measurement operation (step 606). As described above with reference to FIG. 4, the constructed compensation pulse may not exactly counteract identified uncontrolled transitions to qubit levels. For example, the process of identifying uncontrolled transitions to qubit levels, e.g., through measurement, may be imperfect. In addition, construction of the compensation pulse in step 604 may be imperfect. Therefore, the system iteratively repeats steps 602-606 to generate a final compensation pulse. For clarity, an example iteration is described below.

The system identifies uncontrolled transitions to qubit levels during a measurement operation (step 608). For example, for a j-th iteration, the system identifies uncontrolled transitions to qubit levels during a measurement operation with a current compensation pulse applied to the qubit, e.g., with $c^j(t)$ applied to the qubit.

The system determines whether a completion condition has occurred (step 610). In some implementations determining whether a completion condition occurs comprises determining that no uncontrolled shifts in frequency or uncontrolled transitions to different qubit levels occur during a measurement operation.

In response to determining that the completion condition has not occurred, the system constructs a subsequent compensation pulse for a next iteration (step 612). For example, for a j-th iteration, the system may use a known map from magnetic flux bias to qubit frequency transition to construct a subsequent compensation pulse $c^{j+1}(t)$ for the j+1-th iteration that counteracts identified uncontrolled transitions to qubit levels in the current j-th iteration.

In response to determining that the completion condition has occurred, the system uses the most recently constructed compensation pulse as the determined compensation pulse (step 614). The system may then apply the determined compensation pulse to the qubit during the qubit measurement operation to maintain the qubit frequency, as described above with reference to step 304 of FIG. 3.

Figure 7:
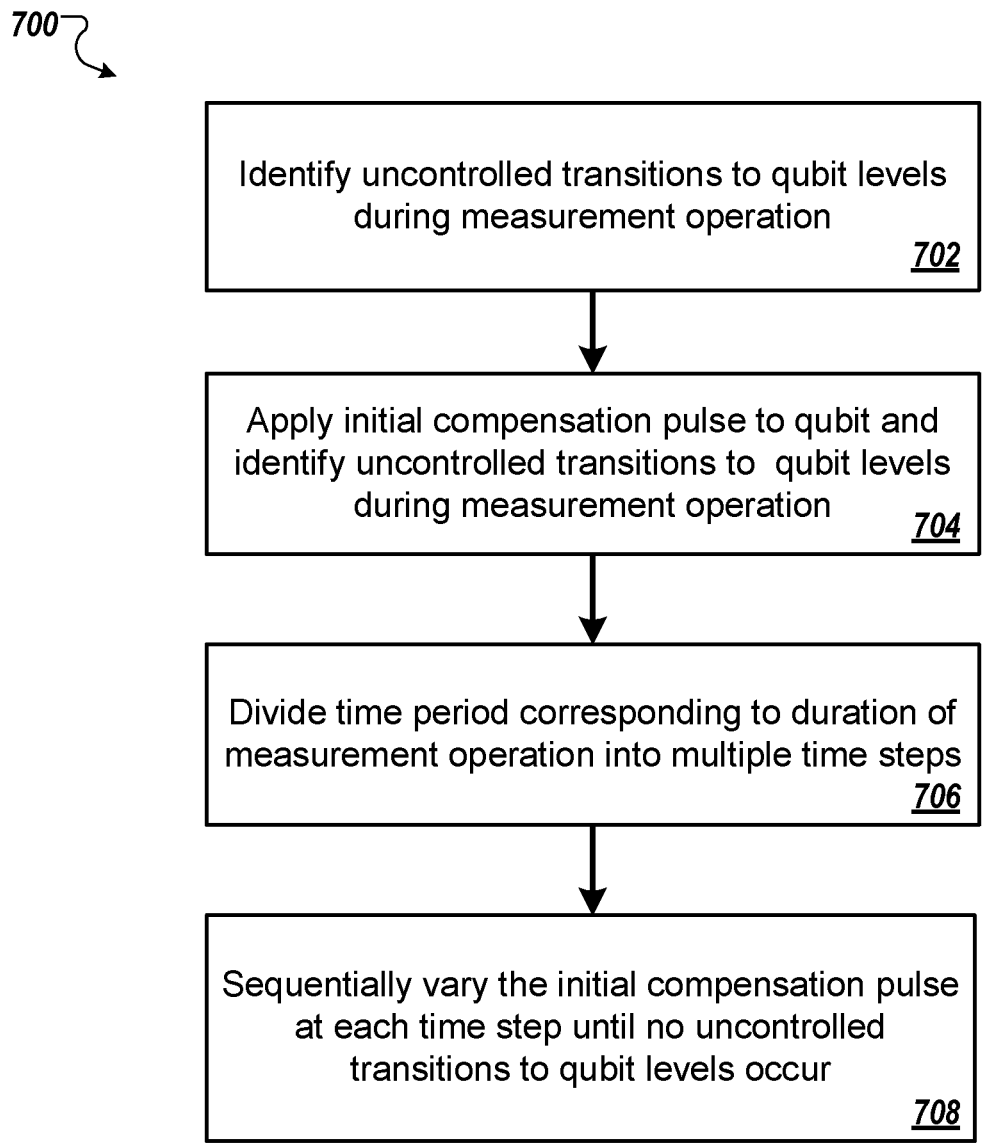
FIG. 7 is a flowchart of an example time-step process for determining compensation pulses to counteract qubit level crossings.

FIG. 7 is a flowchart of an example time-step process 700 for determining compensation pulses to counteract qubit level crossings, as described above with reference to step 302 of FIG. 3. For example, the determined compensation pulse may be used to counteract transitions to non-computational qubit levels during a measurement operation. The process 700 may be performed by the frequency controller 106 of system 100 described above with reference to FIG. 1.

The system identifies uncontrolled transitions to qubit levels during a measurement operation (step 702). For example, as described above with reference to step 602 of FIG. 6, in cases where the qubit is a superconducting transmon qubit a measurement operation may be performed by probing the frequency of a readout resonator coupled to the qubit. In these cases the system may identify transitions to high qubit levels, e.g., 3- and 6-qubit levels, during a measurement operation caused by interaction of the qubit with the readout resonator. For example, for certain combinations of qubit-resonator detunings and resonator photon numbers, crossings between qubit levels in the transmon-resonator system may occur.

The system applies an initial compensation pulse to the qubit and identifies uncontrolled transitions to qubit levels during a measurement operation (step 704). For example, the system may identify combinations of qubit-resonator detunings and photon numbers that cause uncontrolled transitions to qubit levels and construct a compensation pulse that avoids or moves quickly through the identified combinations.

As described above with reference to FIG. 5, in order to construct an initial compensation pulse the system may define a metric that represents how much the qubit state is transitioning during a measurement operation, i.e., the error. The system may then parameterize a first initial compensation pulse and run a minimization algorithm with respect to the defined metric to construct the initial compensation pulse.

Alternatively, the system may construct an initial compensation pulse by first measuring the values of readout resonator photon number, i.e., qubit AC Stark shift, at which uncontrolled shifts in frequency or uncontrolled transitions to different qubit levels occur. The system may then measure the qubit frequency versus time during the measurement operation in the absence of a compensation pulse. The system may then select a compensation pulse that either keeps the qubit frequency at a predetermined distance from frequencies at which uncontrolled transitions to qubit levels occur, or select a compensation pulse which quickly moves the qubit frequency past frequencies at which uncontrolled transitions to qubit levels occur.

The system divides a time period corresponding to the duration of the measurement operation into a plurality of time steps (step 706). For example, the time period corresponding to the duration of the measurement operation may be represented by [0, T]. In this example, the system may divide the interval [0, T] into a number of discrete time steps, e.g., each of length 1 ns.

The system sequentially varies the initial compensation pulse at each of the plurality of time steps until no or an acceptable amount of uncontrolled transitions to qubit levels occur (step 708). For example the system may first vary the value of the initial compensation pulse at the first time step until the resulting measured qubit frequency shift at that time step is lower than a predetermined acceptable shift. In some implementations this sets the value of the determined compensation at the first time step. For example, the system may sequentially vary the initial compensation pulse at each of the plurality of time steps by maintaining the values of the varied compensation pulse for previous time steps. In some implementations the system may maintain the compensation pulse at a time step if it is determined that a resulting measured qubit frequency shift at the time step is already lower than a predetermined acceptable shift.

The system uses a compensation pulse that has been varied at one or more of the discrete time steps as the determined compensation pulse. The system may then apply the determined compensation pulse to the qubit during the qubit measurement operation to maintain the qubit frequency, as described above with reference to step 304 of FIG. 3

Embodiments of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Embodiments of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, or multiple digital and quantum processors or computers, and combinations thereof. The apparatus can also be, or further include, special purpose logic circuitry, e.g., an FPGA (field programmable gate array), or an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum microprocessors or both, or any other kind of central digital and/or quantum processing unit. Generally, a central digital and/or quantum processing unit will receive instructions and digital and/or quantum data from a read-only memory, or a random access memory, or quantum systems suitable for transmitting quantum data, e.g. photons, or combinations thereof both.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, or optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or electronic system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
performing a quantum computation using one or more qubits that operate at respective qubit frequencies, wherein the quantum computation comprises a measurement operation of a qubit included in the one or more qubits;
during the quantum computation, performing the measurement operation by measuring the qubit to determine a state of the qubit, comprising applying a pre-determined compensation pulse to the qubit during the measurement operation to maintain the qubit frequency by avoiding uncontrolled shifts in qubit frequency, wherein
the compensation pulse is determined by sequentially varying an initial compensation pulse at each of a plurality of time steps and measuring a shift in frequency during a measurement operation using the varied initial compensation pulse until a resulting measured shift in frequency is lower than a predetermined acceptable shift.

2. The method of claim 1, wherein the compensation pulse comprises a time-dependent control waveform.

3. The method of claim 1, wherein sequentially varying the initial compensation pulse at each of the plurality of time steps comprises, for each time step, maintaining values of the varied compensation pulse for previous time steps.

4. The method of claim 1, wherein the plurality of time steps correspond to a time period corresponding to a duration of the measurement operation.

5. The method of claim 1, wherein each qubit occupies one of a plurality of qubit levels, and wherein controlled shifts in qubit frequency comprise uncontrolled transitions to qubit levels.

6. The method of claim 5, wherein the qubit levels comprise two computational qubit levels and one or more non-computational qubit levels that are each higher than the computational qubit levels, and wherein uncontrolled transitions to qubit levels comprise uncontrolled transitions to non-computational qubit levels.

7. The method of claim 1, wherein the one or more qubits comprise superconducting qubits.

8. The method of claim 1, wherein the compensation pulse comprises a magnetic flux bias that tunes the qubit frequencies.

9. The method of claim 1, wherein during the measurement operation a readout resonator is coupled to the qubit and driven by an external radio frequency source.

10. The method of claim 1, wherein controlled shifts in qubit frequency occur due to coupling of the qubit to other two or more level systems.

11. An apparatus comprising:
one or more qubits that operate at respective qubit frequencies;
a radio frequency source configured to drive one or more readout resonators that are coupled to the one or more qubits using probe pulses, wherein driving a respective readout resonators probes a frequency of the readout resonator to measure a qubit that is coupled to the readout resonator; and
a frequency controller that is configured to control the qubit frequencies;
wherein the apparatus is configured to:
during a quantum computation that comprises a measurement operation of a qubit included in the one or more qubits,
perform the measurement operation by measuring, by the radio frequency source, the qubit to determine a state of the qubit, comprising applying, by the frequency controller, a pre-determined compensation pulse to the qubit during the measurement operation to maintain the qubit frequency by avoiding uncontrolled shifts in qubit frequency, wherein
the compensation pulse is determined by sequentially varying an initial compensation pulse at each of a plurality of time steps and measuring a shift in frequency during a measurement operation using the varied initial compensation pulse until a resulting measured shift in frequency is lower than a predetermined acceptable shift.

12. The apparatus of claim 11, wherein the compensation pulse comprises a time-dependent control waveform.

13. The apparatus of claim 11, wherein sequentially varying the initial compensation pulse at each of the plurality of time steps comprises, for each time step, maintaining values of the varied compensation pulse for previous time steps.

14. The apparatus of claim 11, wherein the plurality of time steps correspond to a time period corresponding to a duration of the measurement operation.

15. The apparatus of claim 11, wherein each qubit occupies one of a plurality of qubit levels, and wherein controlled shifts in qubit frequency comprise uncontrolled transitions to qubit levels.

16. The apparatus of claim 15, wherein the qubit levels comprise two computational qubit levels and one or more non-computational qubit levels that are each higher than the computational qubit levels, and wherein uncontrolled transitions to qubit levels comprise uncontrolled transitions to non-computational qubit levels.

17. The apparatus of claim 11, wherein the one or more qubits comprise superconducting qubits.

18. The apparatus of claim 11, wherein the compensation pulse comprises a magnetic flux bias that tunes the qubit frequencies.

19. The apparatus of claim 11, wherein the apparatus further comprises one or more readout resonators, and wherein during the measurement operation one of the readout resonators is coupled to the qubit and driven by an external radio frequency source.

20. The apparatus of claim 11, wherein controlled shifts in qubit frequency occur due to coupling of the qubit to other two or more level systems.

* * * * *